P. R. CRALL.
STOP VALVE BOX.
APPLICATION FILED MAR. 1, 1919.
1,310,521.
Patented July 22, 1919.
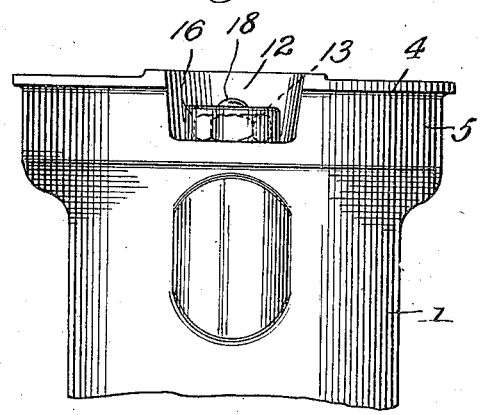
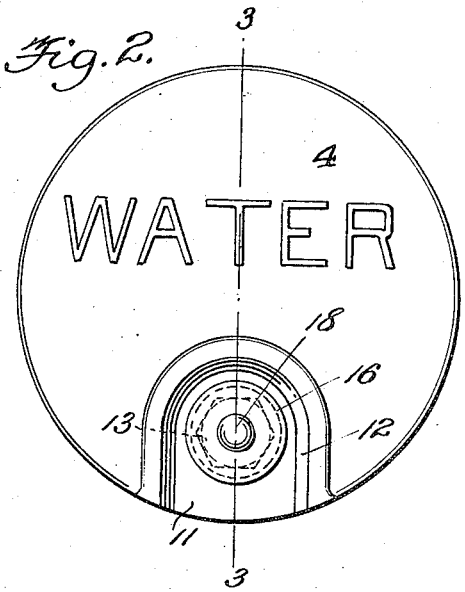
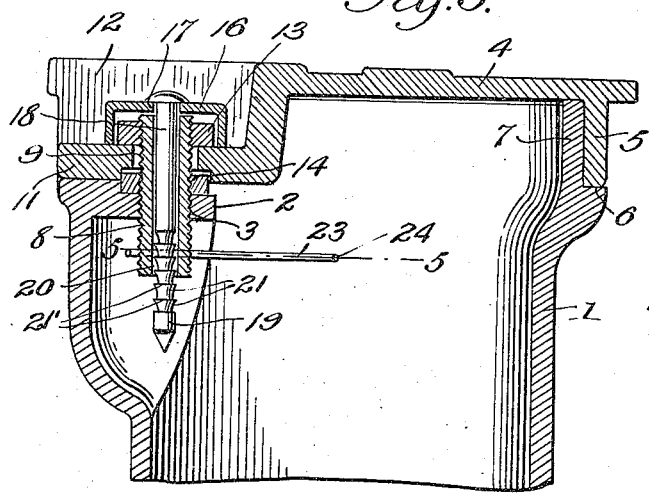
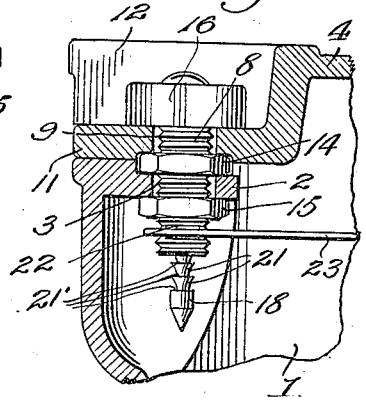
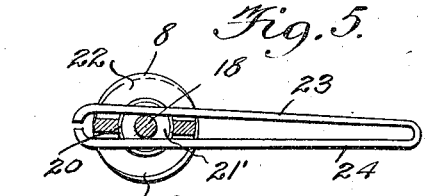
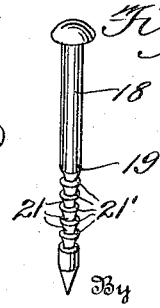
Witness
H. S. McDowell
Inventor
Prentiss R. Crall
By C. C. Shepherd
Attorney
THE COLUMBIA PLANOGRAPH CO., WASHINGTON, D. C.

UNITED STATES PATENT OFFICE.

PRENTISS R. CRALL, OF COLUMBUS, OHIO.

STOP-VALVE BOX.

1,310,521.  Specification of Letters Patent.  Patented July 22, 1919.

Application filed March 1, 1919. Serial No. 280,057.

*To all whom it may concern:*

Be it known that I, PRENTISS R. CRALL, a citizen of the United States, residing at Columbus, in the county of Franklin and State of Ohio, have invented certain new and useful Improvements in Stop-Valve Boxes, of which the following is a specification.

This invention relates broadly to stop valve boxes of the type employed in connection with subterranean valve structures for governing the flow of water or gas through suitable ducts or mains and has particular reference to the type such as are commonly found in a city's water distribution system and which operate to exteriorly control the supply of water from a main line pipe into branches leading into private residences or other suitable localities.

One of the objects of the invention is to provide an improved adjustable connecting structure between the upper end of such a stop valve box and its associated cover plate wherein the structure is formed with adjustable features so as to be adaptable to cover plates of varying cross-sectional thickness in order that a secure union will be provided between parts and so that no portion thereof will protrude above the plate to such extent that persons passing by would be caused to stumble or otherwise injure themselves by reason of the same.

Another object of the invention resides in a substantially frangible casing for sealing the removable portion of the connecting structure, in order that unauthorized persons will be prevented from removing the cover plate to effect the manipulation of the associated valve structure; to prevent theft on part of the connection itself; or in the event of such unauthorized tampering to provide means whereby the fact will be made known to one inspecting the same.

A further object of the invention is to improve upon the construction disclosed in my co-pending application for a similar structure filed December 21, 1918, bearing Serial Number 267,854 by providing means whereby the sealing of the connecting structure may be accomplished in a more compact and efficient manner at the same time to reduce the proportion of the sealing structure so that it will offer no impediment in the way of those passing thereby and to adapt a sealing structure to cover plates of various proportions.

Other objects of the invention will be in part obvious and in part pointed out hereinafter.

The invention accordingly consists in the novel features of construction, combinations of elements, and arrangement of parts hereinafter fully described and having the scope thereof pointed out in the appended claims.

In the drawing, forming a part of this specification, and in which similar characters of reference denote like and corresponding parts:

Figure 1 is a view in elevation of the upper portion of a stop valve box and its associated cover plate having my improved connecting and sealing structure applied thereto, Fig. 2 is a top plan view thereof, Fig. 3 is an enlarged vertical sectional view taken along the line 3—3 of Fig. 2, Fig. 4 is a similar view disclosing a slightly modified manner of connecting the threaded member of the connection to the upper end of the box, Fig. 5 is a horizontal sectional view taken along the line 5—5 of Fig. 3, Fig. 6 is a detail perspective view of the pin member employed in effecting the sealing of the frangible nut casing, and Fig. 7 is a similar view of the spring locking device.

Referring more particularly to the details of the invention, the same is preferably employed in connection with the usual cylindrical stop valve box 1, which is ordinarily used by gas and water distributing systems and through which access is gained to a subterranean located valve structure, not shown, which controls a supply of water or gas to adjoining premises. The upper and otherwise open end of the stop box body is provided with the usual inwardly projecting, horizontally disposed lug or web 2, in which is formed a threaded opening 3. A top or cover plate 4 is employed in connection with the upper end of the box 1 to cover the same and to normally maintain its interior inaccessible. This plate 4 is provided with an annular depending rim 5 which is adapted to seat upon a shoulder 6 formed upon the reduced upper end 7 of the box.

In order to securely unite the cover 4 with said box, use is made of a substantially hollow threaded member 8, which is arranged to be received within the opening 3 of the web 2, and projects a sufficient distance above the upper wall of the web to pass through and above a coöperative opening 9 formed in the lower wall 11 of a depression 12 provided in the cover 4. By threading the member 8, it is possible to vertically adjust the same so that more or less of its upper end will project into the depression 12, and this amount is controlled by the thickness of the wall 11. This is due to the fact that this wall 11 varies considerably in thickness in accordance with the design of cover plate employed, and hence it is necessary that a sufficient part of the threaded member 8 will project above the upper part of the wall 11 in order to provide ample room for a securing nut 13, which is adapted to be threaded upon the said protruding upper end of the member 8 and to be brought to bear with binding friction upon the wall 11 so as to hold the plate 4 in rigid relation with respect to the upper end 7 of the box. The lock nut 14 may be provided upon the threaded member so as to engage with the upper side of the web 2, this latter nut effects a secured adjustment on part of the threaded member and prevents its undue rotation and consequent loss of adjustment.

From the foregoing it will be apparent that by virtue of this adjustable thread member, the nut 13 will be always capable of exerting its maximum utility irrespective of the varying thickness, as are found in practice, on part of the wall 11 of the cover plate. The depression 12 is of sufficient depth to maintain said nut appreciably lower than the upper surface of the cover 4. This prevents the nut from projecting above the cover plate, and thereby eliminates objectionable protuberances in the structure as a whole.

As shown in Fig. 4, it is not necessary to thread the opening 3 of the web 2 in order to render the member 8 adjustable. This result may be accomplished with equal facility and efficiency by simply providing the threaded portion of the member 8 below the web 2 with a second lock nut 15, the latter, as shown, is threaded into engagement with the lower surface of said web and, operating in conjunction with the nut 14, will serve to support the threaded member in rigid yet adjustable relation with respect to said web with precisely the same efficiency as in the preferred form. In other words, the modification eliminates the necessity of threading the opening 3, and thus has a tendency to cheapen the construction and to a certain extent overcomes corrosion. It will thus be apparent that an improved connecting structure between the parts 1 and 4 is provided and one which will compensate for inequalities in the cover plate construction.

If the nut should be left unprotected, it will be obvious that unscrupulous persons could readily effect its removal in order to gain admittance to the associated valve structure or to effect the theft of the connection itself, which is preferably formed from brass and possesses a certain amount of intrinsic value, and if this is done the interior of the box is left open, and may thus readily fill with foreign clogging matter, which is very difficult to extricate and involves a costly procedure. Therefore, the present invention provides means for sealing the connecting structure so that the same can not be readily tampered with, or if this is done to permit an inspector to readily detect the fact that suitable repairs can be made.

The sealing structure in its preferred embodiment consists of a frangible casing 16, preferably formed from cast iron, and is in the nature of an inverted cup, being therefore capable of being placed around the nut 13 so as to completely house the latter. It will be noted that the casing is merely large enough to receive the nut 13, and therefore will not possess sufficient body to form an objectionable protruding element. In fact, the lower surface of the nut 13 bears directly upon the exterior surface of the wall 11, and the housing which surrounds the same also at its lower peripheral edge disposed to contact directly with the upper surface of the web. This construction results in a very compact and space economizing structure, and in this respect differs slightly from the construction disclosed in my aforesaid co-pending application. It will thus be seen that the casing 16 will be seated within the depression 12 and will be at all times substantially below the level of the upper surface of the cover 4.

In order to lock the casing in position, the same is provided in its preferred embodiment with an axial opening 17 which is adapted to receive the shank of a locking pin 18. The latter is provided with a rounded head which bears upon the upper surface of the casing 16 and is further provided with an elongated, depending shank 19, this shank is disposed to extend approximately through the bore 20 of the hollow threaded member 8 and is formed at its lower end with a plurality of tapering grooves 21, which provide vertically spaced annular ribs or offsets 21' upon the shank, and the lower end of the latter is preferably tapered to effect the convenient guidance of the pin into the bore 20.

To automatically lock the pin within the threaded member so as to prevent the removal of the casing, said threaded member is provided adjacent to its lower end with slots 22, the latter being in communication with the central bore 20, adapted to be fitted within the slots is a spring locking device 23, preferably formed from resilient wire and having its free ends inwardly bent so that the same will normally press toward the bore 20. It will be obvious that by inserting the pin 18 into the bore 20 and by forcing the same downwardly so that the casing will contact with the wall of the depression 12 that the ends of the locking device 23 will be resiliently spread by the tapered end of the locking pin, so that the same will snap into locking engagement with any one of the vertically disposed offsets 21, thus preventing retraction on part of the pin and the consequent removal of the casing 16. This locking device may be readily inserted into position by virtue of the open end construction of the box 1 and is provided with a substantially elongated handle portion 24 to permit this operation to be conveniently accomplished. The handle 24 may be rotated about the locking member, so that it will not interfere with the insertion of a tool to operate the valve structure.

From the foregoing it will be apparent that there is provided mechanism whereby the objects of this invention have been achieved, and that all of the advantageous features of construction and operation above mentioned are, among others, present. It will be manifest that it will be impossible to remove the nut 13 after the casing member has been placed thereabout without first having fractured the casing, and if this is surreptitiously performed the fact will be apparent to an inspector by a mere glance. Thus after the plate has been removed by authorized parties, it is simply necessary to place a new casing about the nut 13, as this is the only member broken when the cover plate is removed. The device is exceptionally substantial in construction and is fully capable of withstanding severe usage or the inclement weather to which it may be subjected. The casing serves to incase the connecting structure and to a large extent prevents corrosion therein and, as above pointed out, the very compactness of the sealing structure and its location within the depression 12 will prevent the same from projecting into the path of those passing by. To effect the sealing of the nut 13, it is simply necessary to pass the casing 16 thereabout and to then insert the pin 18 into the bore of the threaded member, the pin automatically locking itself by virtue of the resilient locking device 23.

By threading the member 8 it is obviously possible to vertically adjust the same and this state of adjustability on part of the member allows a close seating on part of the casing within the depression 12 of the cover plate, thus preventing the insertion of a tool under the casing so that the latter may be removed to effect the removal of the nut. Again, this adds to the protection of the spring device at the bottom of the thread member by preventing the latter from being sprung out of its locking position. In other words, it is by rendering the thread member adjustable that coöperation is established between the same and the sealing casing, this being attained by the fact that close engagement between the lower edges of the casing and the wall 11 is always and positively insured.

What I claim is:

1. In a stop valve box for fluid mains, the combination with the upper end of said box and a separable top plate therefor, of means for effecting a connection therebetween, comprising a threaded member protruding upwardly from the top of said box and capable of extending through and above an opening therefor formed in said top plate, adjustable means coöperative with said member to govern the distance between the upper end of said member and the correlated upper surface of said top plate, and a nut threaded upon the upper end of said member and operating to bear upon said top plate to hold the latter in clamped relation with said box.

2. In a stop valve box for fluid mains, the combination with the upper end of said box and a separable top plate therefor, of means for effecting a connection therebetween, comprising a threaded member carried internally of said box and having its upper end disposed to extend through an opening formed in said top plate, a lock structure carried by said member for governing its extent of projection through and above said opening and to lock the same in its adjusted positions, and a clamping device threaded upon the upper end of said member and arranged to frictionally engage with said top plate to retain the latter in secured relation to said box.

3. In a stop valve box for fluid mains, the combination with the upper end of said box and a cover plate therefor, a hollow bolt member carried by said box and disposed to project through and above an opening formed in said plate, a nut carried by the upper threaded end of said member and operating to maintain the plate in clamped relation with the upper end of said box, of a seal for said nut comprising a substantially frangible casing disposed to house a nut, a pin projecting vertically downward from said casing and situated to extend into said bolt member, and spring means coöperative with said pin and bolt member and serving to normally prevent the removal of said casing from its operative position surrounding said nut.

4. In a stop valve box for fluid mains, the combination with the upper end of said box and a top or cover element therefor, of means for effecting a connection therebetween, comprising a hollow threaded member adjustably carried by the upper end of said box and arranged to pass through and above an opening thereof formed in said cover element, a nut threaded upon the upper end of said member to hold said element in connection with said box, a casing of a substantially frangible nature disposed to inclose said nut, means for retaining said casing in its applied position, comprising a vertically depending pin having its lower portion extended into the hollow part of said threaded member, spring means coöperative with said pin and threaded member to prevent withdrawal of the casing from its position about said nut, and a plurality of vertically spaced offsets formed on the lower portion of said pin for casing holding coöperation with said spring means, said offsets permitting of relative vertical adjustment between said pin and said spring means.

5. In a stop valve box for fluid mains, the combination with the upper end of said box and a top or cover plate therefor, a hollow threaded member protruding upwardly from said box and through and above an opening formed in said plate, a nut threaded upon the upper end of said member and arranged to bear upon said plate to hold the latter in connected relation with said box, of means for sealing said nut to prevent removal thereof, comprising a casing arranged to house the nut, a pin coöperative with said casing and having its shank portion located substantially within said hollow member, the lower end of said pin being grooved, and a spring element carried by said member and provided with resilient end portions disposed to automatically engage with the grooved part of said pin to lock said casing in its position about said nut.

6. In a stop valve box for fluid means, and a combination with the upper end of said box and a separable top plate therefor, means for effecting a connection between said box and top plate, comprising a threaded member protruding upwardly from said box and capable of extending through an opening thereof formed in said top plate, a nut carried by the upper threaded end of said member and operating to clamp said plate to the upper end of said box, of means for sealing said nut comprising a frangible casing operable to incase the nut, and means passing through said casing and said threaded member to lock said casing in its applied position about said nut, said casing being capable of being maintained in sealing relation with respect to said nut by the adjustability of said threaded member.

7. In a stop valve box for fluid mains, the combination with the upper end of said box and the separable top plate therefor, means for effecting a connection between said box and said top plate, comprising a threaded element having a bore formed therein, said element being received within alined openings formed in said box and plate to retain the latter in secured relation with said box, of means for sealing said element to prevent its removal, comprising a substantially frangible casing arranged to enhouse the end of said element protruding through the opening in said cover plate, a depending member carried by said casing and disposed to lie within the bore of said element, and spring means coöperative with said member to prevent the retraction of the latter from said bore.

8. In locking mechanism of the class described, the combination with a pair of adjacent members, a threaded element for uniting said members, said element having a bore formed therein, of means for preventing removal of said element from its member uniting position, comprising a frangible casing disposed to surround the exposed end of said element, a stud carried by said casing and situated within the bore of said element, and spring means coöperative with said element and capable of entering said bore to lock the stud therein.

9. In locking mechanism of the class described, the combination with a pair of adjacent members, a threaded element for uniting said members, said element having a recess formed therein, of means for preventing removal of said element from its member uniting position, comprising a casing disposed to surround the actuating end of said element, a grooved stud coöperative with said casing and capable of lying within the recess of said element and a resilient device including a pair of spring arms arranged to extend within an opening formed transversely in said element to engage with the groove of said stud, whereby the latter will be locked within said recesses.

In testimony whereof I affix my signature.

PRENTISS R. CRALL.